(12) United States Patent
Ogg

(10) Patent No.: US 10,319,982 B2
(45) Date of Patent: *Jun. 11, 2019

(54) COATED IRON ELECTRODE AND METHOD OF MAKING SAME

(71) Applicant: ENCELL TECHNOLOGY, INC., Alachua, FL (US)

(72) Inventor: Randy Gene Ogg, Newberry, FL (US)

(73) Assignee: ENCELL TECHNOLOGY, INC., Alachua, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/169,275

(22) Filed: Jan. 31, 2014

(65) Prior Publication Data

US 2014/0220440 A1 Aug. 7, 2014

Related U.S. Application Data

(60) Provisional application No. 61/759,777, filed on Feb. 1, 2013.

(51) Int. Cl.
| | | |
|---|---|---|
| *H01M 10/30* | (2006.01) | |
| *H01M 4/52* | (2010.01) | |
| *H01M 4/04* | (2006.01) | |
| *H01M 4/24* | (2006.01) | |
| *H01M 4/38* | (2006.01) | |
| *H01M 4/62* | (2006.01) | |

(Continued)

(52) U.S. Cl.
CPC ......... *H01M 4/0404* (2013.01); *H01M 4/248* (2013.01); *H01M 4/38* (2013.01); *H01M 4/621* (2013.01); *H01M 4/661* (2013.01); *H01M 4/74* (2013.01); *H01M 4/808* (2013.01); *H01M 4/0411* (2013.01); *H01M 4/0419* (2013.01); *H01M 2004/021* (2013.01)

(58) Field of Classification Search
CPC .... H01M 4/366; H01M 4/402; H01M 4/0411; H01M 4/0419
USPC .................................................. 429/121–347
See application file for complete search history.

(56) References Cited

U.S. PATENT DOCUMENTS

| | | | |
|---|---|---|---|
| 3,630,781 A | | 12/1971 | Rampel |
| 3,836,397 A | * | 9/1974 | Hardman ............. H01M 4/248 |
| | | | 429/206 |

(Continued)

FOREIGN PATENT DOCUMENTS

| | | |
|---|---|---|
| JP | 2002025983 A | 9/1972 |
| JP | S4870833 | 9/1973 |

(Continued)

OTHER PUBLICATIONS

International Search Report from Corresponding Application No. PCT/US14/14028 dated May 21, 2014.

(Continued)

*Primary Examiner* — James Lee
(74) *Attorney, Agent, or Firm* — Merchant & Gould

(57) ABSTRACT

Provided is an iron based electrode comprising a single layer of a conductive substrate coated on at least one side with a coating comprising an iron active material and a binder. The iron based electrode is useful in a Ni—Fe battery as the anode. The electrode can also be prepared by continuously coating each side of the substrate with a coating mixture comprising the iron active material and binder.

6 Claims, 4 Drawing Sheets

(51) Int. Cl.
H01M 4/66 (2006.01)
H01M 4/74 (2006.01)
H01M 4/80 (2006.01)
H01M 4/02 (2006.01)

(56) References Cited

U.S. PATENT DOCUMENTS

| | | | |
|---|---|---|---|
| 4,021,911 | A | 5/1977 | Kononenko et al. |
| 4,123,568 | A | 10/1978 | Kononenko et al. |
| 4,216,045 | A | 8/1980 | Morioka |
| 5,780,184 | A | 7/1998 | Coco et al. |
| 6,440,605 | B1 * | 8/2002 | Kise ................. H01M 2/34 29/623.1 |
| 2005/0158625 | A1 * | 7/2005 | Im et al. ................. 429/231.1 |
| 2006/0251965 | A1 * | 11/2006 | Nagayama et al. .......... 429/209 |
| 2008/0057403 | A1 | 3/2008 | Issaev et al. |
| 2009/0068565 | A1 * | 3/2009 | Lee ................. 429/331 |
| 2009/0253033 | A1 * | 10/2009 | Hirose et al. ............... 429/176 |
| 2011/0020534 | A1 | 1/2011 | Chou |
| 2011/0039159 | A1 | 2/2011 | Ryu et al. |
| 2012/0070746 | A1 | 3/2012 | Mikhaylik et al. |

FOREIGN PATENT DOCUMENTS

| | | |
|---|---|---|
| JP | H06295727 | 10/1994 |
| JP | 2000354960 | 12/2000 |
| JP | 2001176502 | 6/2001 |
| JP | 2006-024414 A | 1/2006 |
| JP | 2007-214038 A | 8/2007 |
| JP | 2010-503148 | 1/2010 |
| JP | 2011009203 | 1/2011 |
| JP | 2013-065423 | 4/2013 |

OTHER PUBLICATIONS

Chinese Office Action issued in corresponding Chinese Patent Application No. 201480005588.8, dated Aug. 9, 2017.
Japanese Office Action issued in corresponding Japanese Patent Application No. 2015-556150 dated Nov. 28, 2017.
EP Extended Examination Search Report issued in corresponding EP Patent Application No. 14745486.2 dated Jul. 20, 2016.
AU Examination Report issued in corresponding Australian Patent Application No. 2014212256 dated Jun. 6, 2017.
CN Office Action issued in corresponding Chinese Patent Application No. 201480005588.9 dated Oct. 9, 2016.

* cited by examiner

Active material pouch

COATED IRON ELECTRODE AND METHOD OF MAKING SAME

CROSS REFERENCE TO RELATED APPLICATIONS

This application claims priority to U.S. Provisional Application Ser. No. 61/759,777, filed Feb. 1, 2013, which application is incorporated herein by reference in its entirety.

BACKGROUND OF THE INVENTION

Field of the Invention

The present invention is in the technical field of energy storage devices. More particularly, the present invention is in the technical field of rechargeable batteries using an iron electrode.

State of the Art

Iron electrodes have been used in energy storage batteries and other devices for over one hundred years. Iron electrodes are often combined with a nickel base cathode to form a nickel-iron battery. The nickel-iron battery (Ni—Fe battery) is a rechargeable battery having a nickel (III) oxide-hydroxide cathode and an iron anode, with an electrolyte such as potassium hydroxide. The active materials are held in nickel-plated steel tubes or perforated pockets. It is a very robust battery which is tolerant of abuse, (overcharge, overdischarge, and short-circuiting) and can have a very long life even if so treated. It is often used in backup situations where it can be continuously charged and can last for more than 20 years. Due to its low specific energy, poor charge retention, and high cost of manufacture, however, other types of rechargeable batteries have displaced the nickel-iron battery in most applications.

The ability of these batteries to survive frequent cycling is due to the low solubility of the reactants in the electrolyte. The formation of metallic iron during charge is slow because of the low solubility of the ferrous hydroxide. While the slow formation of iron crystals preserves the electrodes, it also limits the high rate performance. These cells charge slowly, and are only able to discharge slowly. Nickel-iron cells should not be charged from a constant voltage supply since they can be damaged by thermal runaway. The cell internal voltage drops as gassing begins, raising the temperature, which increases current drawn and so further increases gassing and temperature.

The methods used in the preparation of the iron electrode (anode) have contributed to the low performance versus cost of the Ni—Fe battery.

The technology of preparing iron electrodes is well known and the current preferred process for making these electrodes is a pocket design. The pocket design is not cost effective and is complex in its manufacture. Pocket design electrodes are also difficult to produce in high volumes, and the energy and power utilization from this design is low. What is needed is a low cost, high volume, high quality and high performance iron electrode design and manufacturing process.

SUMMARY OF THE INVENTION

The present invention provides one with a novel coated iron electrode and an improved method of manufacturing the iron electrode. Provided is an iron based electrode comprising a single layer of a conductive substrate coated on at least one side with a coating comprising an iron active material and a binder. The iron based electrode is useful in a Ni—Fe battery as the anode. The electrode is prepared by coating the substrate with a coating mixture comprising the iron active material and binder.

The manufacturing benefits are lower cost, higher volume, continuous process, if desired, and a higher quality product and method for manufacturing compared to the standard pocket electrode design.

DETAILED DESCRIPTION OF THE INVENTION

Figure 1:
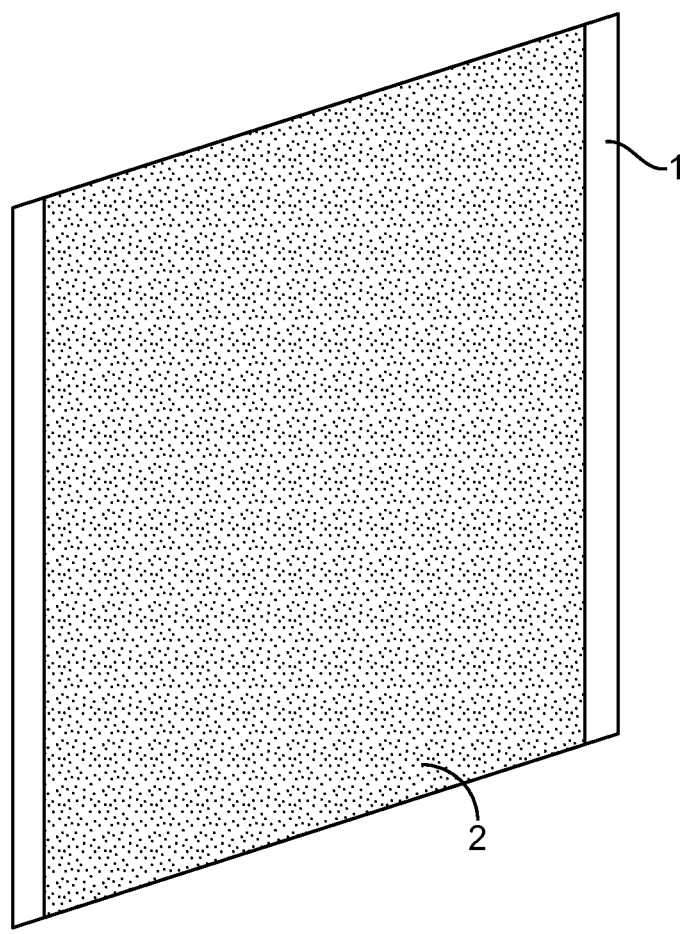
FIG. 1 is a perspective view of a coated iron electrode of the present invention.

The invention comprises an iron electrode comprised of a single, coated conductive substrate, prepared by a simple coating process, which can be continuous.

The substrate is used as a current conducting and collecting material that houses the active material (iron) of the electrode. In the current pocket design, the substrate encompasses the active material and holds the material. Two layers of substrate are therefore required per electrode. In the present invention, a single layer of substrate is used. This single layer acts as a carrier with coated material bonded to at least one side. In one embodiment, both sides of the substrate are coated. This substrate may be a thin conductive material such as a metal foil or sheet, metal foam, metal mesh, woven metal, or expanded metal. For example, a 0.060 inch, 80 ppi, nickel foam material has been used.

The coating mix is a combination of binder and active materials in aqueous or organic solution. The mix can also contain other additives such as pore formers. Pore formers are often used to insure sufficient $H_2$ movement in the electrode. Without sufficient $H_2$ diffusion, the capacity of the battery will be adversely affected. The binder materials have properties that provide adhesion and bonding between the active material particles, both to themselves and to the substrate current carrier. The binder is generally resistant to degradation due to aging, temperature, and caustic environment. The binder can comprise polymers, alcohols, rubbers, and other materials, such as an advanced latex formulation that has been proven effective. A polyvinyl alcohol binder is used in one embodiment.

The active material for the mix formulation is selected from iron species that are generally less oxidative. Such materials include metal Fe and iron oxide materials. The iron oxide material will convert to iron metal when a charge is applied. A suitable iron oxide material includes $Fe_3O_4$. In addition, any other additives are generally required to be of a less oxidative nature, such as sulfur, antimony, selenium, and tellurium.

The coating method can be a continuous process that applies the active material mixture to the substrate such as spraying, dip and wipe, extrusion, low pressure coating die, or surface transfer. A batch process can also be used, but a continuous process is advantageous regarding cost and processing. The coating mixture has to maintain a high consistency for weight and thickness and coating uniformity. This method is conducive to layering of various materials and providing layers of different properties such as porosities, densities and thicknesses. For example, the substrate can be coated with three layers. The first layer being of high density, second layer of medium density, and final layer of a lower density to create a density gradient which improves the flow of gases from the active material to the electrolyte, and provides better electrolyte contact and ionic diffusion with the active material throughout the structure of the electrode.

After coating, the electrode is dried to remove any residual liquid, i.e., aqueous or organic solvent. The drying methods will generally provide a continuous method for liquid removal from the coated active material which will enhance the adhesion and binding effects of the dry constituents without iron ignition. This drying method provides a uniform and stable active material coating with the substrate material. Two stages of drying can be used. For example, the first can be radiation for bulk drying, for cost and quality control, followed by convection drying to remove the remaining liquid. The radiation used can be any radiation, such as infrared, microwave or UV, and is very fast. However, the radiation creates a high temperature at the surface of the coated electrode. The high temperature is fine as long as water is still present to act as a heat sink. Therefore, the water is generally removed to about 10-20 wt % water. This can generally be determined using a control chart. Going below 10% water is dangerous, as the electrode becomes too dry and the high temperature can ignite the iron. Thus, using the convention drying to complete the removal of water/liquid is a preferred embodiment, once the amount of water remaining is in the 10-20 wt % range. In another embodiment, radiation can be used to complete the drying if the process is conducted in an inert atmosphere.

The compaction methods used can be accomplished by rolling mill, vertical pressing, and magnetic compaction of the active material to the desired thickness from 0.005 to 0.500 inches and porosities from 10% to 50%, for high quality and low cost continuous processing. In one embodiment, the porosity of the electrode is from 15-25% porosity. This compaction method can be used in conjunction with the layering method described above for providing material properties of density, thickness, porosity, and mechanical adhesion.

In addition, continuous in-line surface treatments can be applied continuously throughout any of the steps including coating, layering, and drying processes. The treatments can apply sulfur, polymer, metal spray, surface lament, etc.

The iron electrode can be used with a cathode to make a battery, e.g., a Ni—Fe battery with a nickel cathode and the present iron anode. The battery can be made as is conventional, with a standard electrolyte and battery separator. The electrolyte, for example, can be a potassium hydroxide based electrolyte.

The present batteries including the iron electrode can be used, for example, in a cellphone, thereby requiring an electrode with only a single side coated. However, both sides are preferably coated allowing the battery to be used in many applications as is known in the art.

Figure 2:
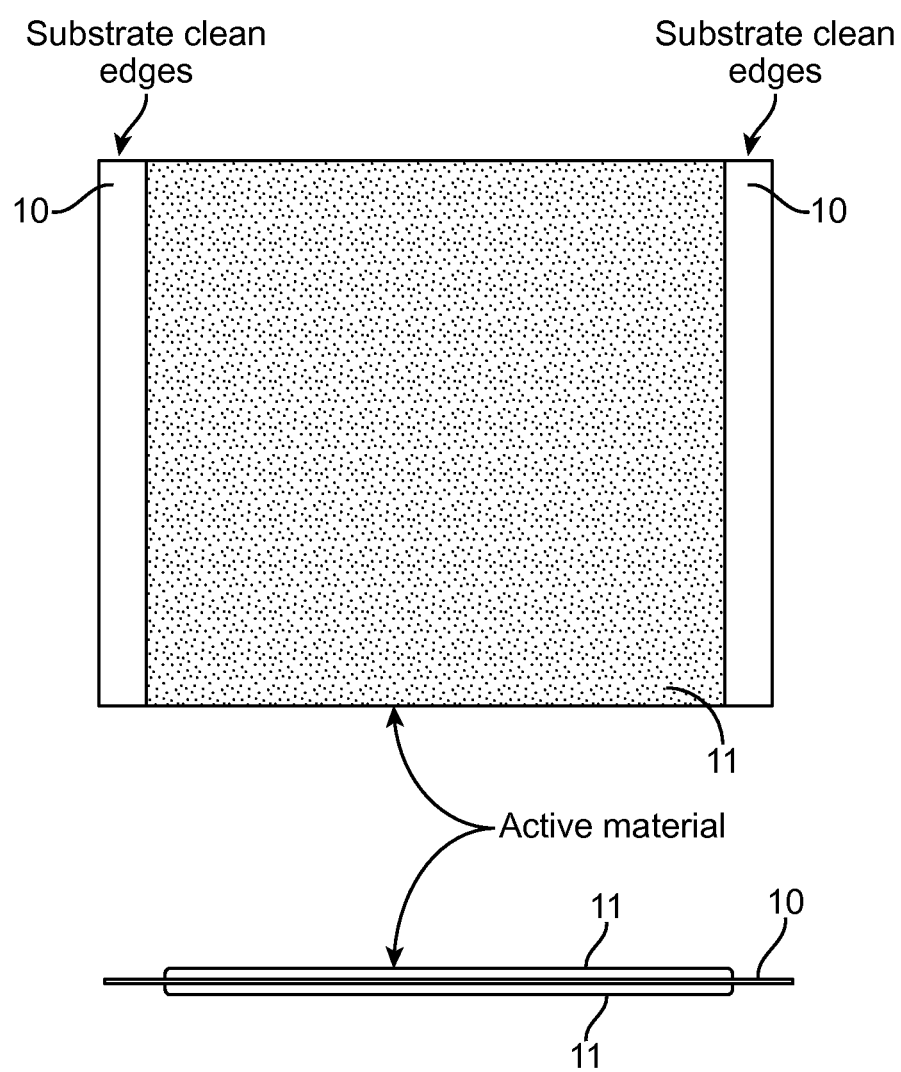
FIG. 2 is a side view and cross-section view of an iron electrode coated on both sides of the substrate in accordance with the present invention.

Turning to the figures of the drawing, FIG. 1 is a prospective view of a coated iron electrode. The substrate 1 is coated on each side with the coating 2 comprising the iron active material and binder. This is further shown in FIG. 2. The substrate 10 is coated on each side with the coating 11 of the iron active material and binder.

Figure 3:
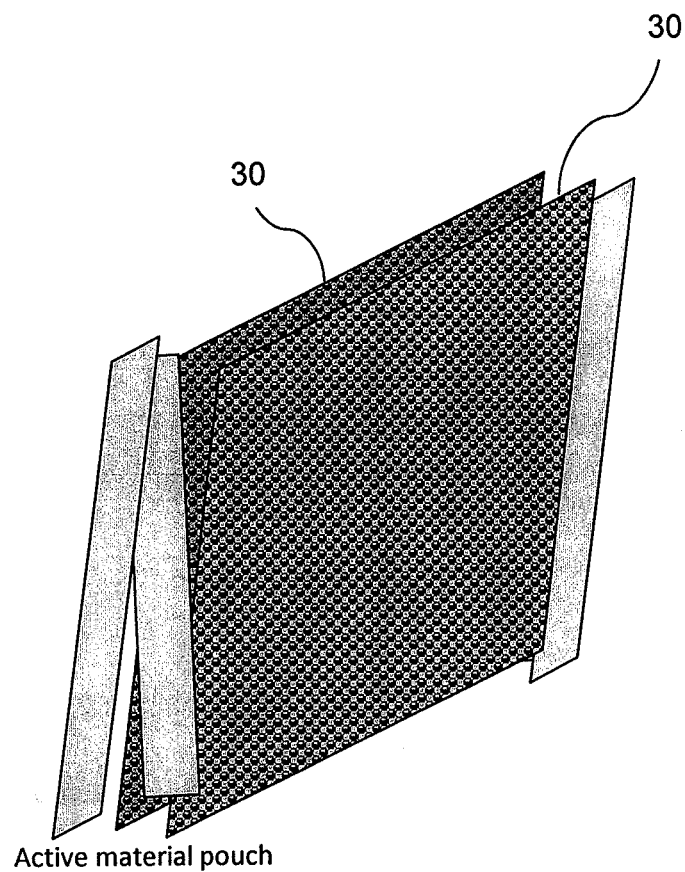
FIG. 3 is a perspective view of a current pocket iron electrode.
Figure 4:
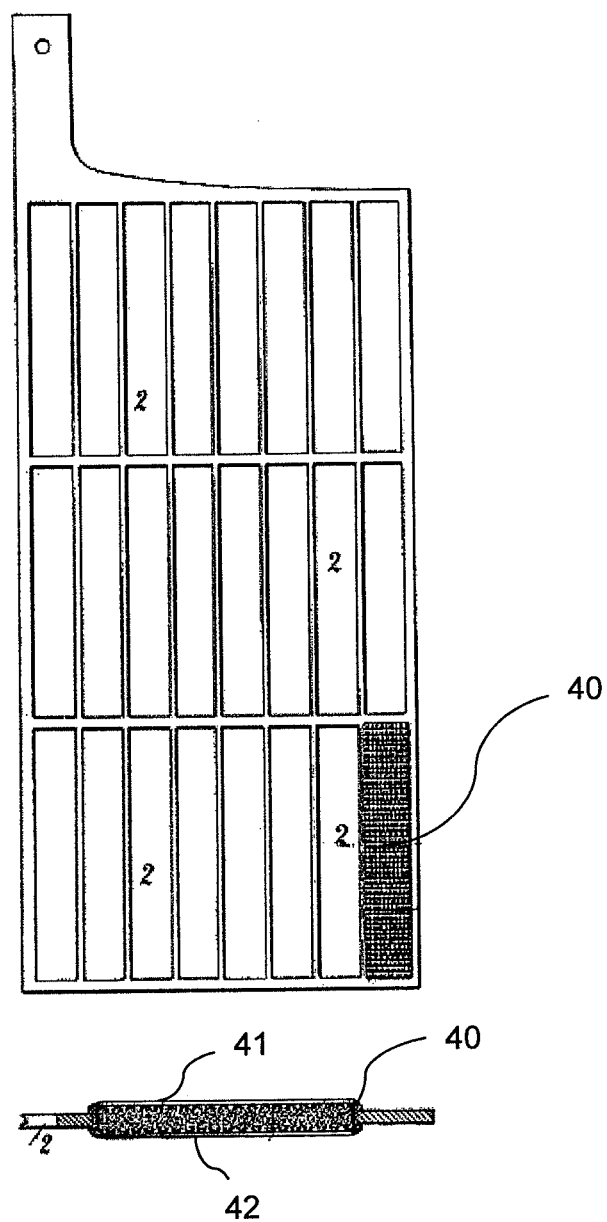
FIG. 4 is a side view and a cross-section view of a current pocket iron electrode.

FIGS. 3 and 4 of the drawing show a conventional pocket iron electrode. In FIG. 3, the two substrates 30 are shown to form the pocket which holds the iron active material. In FIG. 4, the iron active material 40 is held between the two substrates 41 and 42.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A battery comprising a nickel based cathode and an iron anode, with the iron anode comprising a single layer of a conductive substrate coated on at least one side with a coating comprising an iron active material, polyvinyl alcohol and sulfur, wherein the iron active material comprises an Fe metal or iron oxide species, and the substrate is a metal foil, metal sheet, metal foam, metal mesh, woven metal, or expanded metal.

2. The battery of claim 1, wherein the coating on at least one side comprises an antimony, selenium, and tellurium additive, or mixture thereof.

3. The battery of claim 1, wherein the coating is on both sides of the substrate.

4. The battery of claim 1, wherein the substrate is comprised of a nickel foam material.

5. The anode battery of claim 1, wherein the coating comprises a pore former.

6. The battery of claim 1, wherein the porosity of the iron anode is in the range of about 15-25%.

* * * * *

UNITED STATES PATENT AND TRADEMARK OFFICE
CERTIFICATE OF CORRECTION

PATENT NO. : 10,319,982 B2
APPLICATION NO. : 14/169275
DATED : June 11, 2019
INVENTOR(S) : Randy Gene Ogg Page 1 of 1

It is certified that error appears in the above-identified patent and that said Letters Patent is hereby corrected as shown below:

In the Claims

Claim 5:
Column 4, Line 46: Delete "anode", therefor.

Signed and Sealed this
Thirteenth Day of August, 2019

Andrei Iancu
*Director of the United States Patent and Trademark Office*